(12) United States Patent
Maeda et al.

(10) Patent No.: US 11,378,907 B2
(45) Date of Patent: Jul. 5, 2022

(54) HEATING APPARATUS CONFIGURED TO PREVENT POWER FROM BEING SUPPLIED TO BOTH OF FIRST LOAD AND SECOND LOAD, AND IMAGE FORMING APPARATUS

(71) Applicant: Canon Kabushiki Kaisha, Tokyo (JP)

(72) Inventors: Yasukazu Maeda, Kanagawa (JP); Nozomu Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/193,220

(22) Filed: Mar. 5, 2021

(65) Prior Publication Data

US 2021/0278793 A1    Sep. 9, 2021

(30) Foreign Application Priority Data

Mar. 6, 2020 (JP) .............................. JP2020-038980

(51) Int. Cl.
*G03G 15/00* (2006.01)
*G03G 15/20* (2006.01)
*G06K 15/14* (2006.01)

(52) U.S. Cl.
CPC .......... *G03G 15/80* (2013.01); *G03G 15/2053* (2013.01); *G06K 15/14* (2013.01)

(58) Field of Classification Search
CPC .... G03G 15/80; G03G 15/2053; G03G 15/20; H05B 1/0202
See application file for complete search history.

(56) References Cited

U.S. PATENT DOCUMENTS

| | | | | |
|---|---|---|---|---|
| 6,870,140 B2 * | 3/2005 | Cook | ................. | G03G 15/2039 |
| | | | | 219/216 |
| 7,558,498 B2 * | 7/2009 | Fujisawa | .............. | G03G 15/205 |
| | | | | 399/69 |
| 9,575,456 B2 | 2/2017 | Itoh | | |
| 10,067,457 B2 * | 9/2018 | Fujiwara | .............. | H05B 1/0241 |
| 2020/0233348 A1 | 7/2020 | Nakajima et al. | | |

FOREIGN PATENT DOCUMENTS

| | | |
|---|---|---|
| JP | 6022370 A | 2/1985 |
| JP | 06297808 A | 10/1994 |
| JP | 2001100558 A | 4/2001 |
| JP | 2002072726 A | 3/2002 |
| JP | 2003131516 A | 5/2003 |
| JP | 2015072333 A | 4/2015 |

OTHER PUBLICATIONS

Co-pending U.S. Appl. No. 17/193,257, filed Mar. 5, 2021.
Co-pending U.S. Appl. No. 17/227,588, filed Apr. 12, 2021.

* cited by examiner

*Primary Examiner* — Arlene Heredia
(74) *Attorney, Agent, or Firm* — Venable LLP (57) ABSTRACT

A heating apparatus including: a first load; a first switch element configured to switch between supply of power from an AC power source to the first load and shut-off of power supply; a second load; a second switch element configured to switch between supply of power from the AC power source to the second load and shut-off of power supply; and a control unit configured to control the first and the second switch elements to prevent power from being supplied to both of the first load and the second load. The first switch element has the T1 terminal connected to one end of the first load, and the T2 terminal connected to the AC power source. The second switch element has the T2 terminal connected to one end of the second load, and the T1 terminal connected to the AC power source.

13 Claims, 7 Drawing Sheets

HEATING APPARATUS CONFIGURED TO PREVENT POWER FROM BEING SUPPLIED TO BOTH OF FIRST LOAD AND SECOND LOAD, AND IMAGE FORMING APPARATUS

BACKGROUND OF THE INVENTION

Field of the Invention

The present invention relates to a heating apparatus and an image forming apparatus, and more particularly, to a control circuit configured to control a fixing heater of a heating apparatus.

Description of the Related Art

In the related art, there is known a configuration in which a fixing device includes a plurality of heating elements, and the plurality of heating elements are connected in parallel via a plurality of bidirectional thyristors so that a heating element of a length corresponding to a width of a recording sheet, for example, is selectively used to reduce temperature rise of a non-sheet passing portion (see Japanese Patent Application Laid-Open No. 2001-100558, for example). A bidirectional thyristor is hereinafter referred to as "triac." Meanwhile, a triac is generally a semiconductor element intended to control an AC power source. A triac has three terminals: a gate (G) terminal, a T1 terminal, and a T2 terminal, and when a gate current flows through the G terminal and a voltage of the G terminal becomes a threshold voltage or more, an electric current flows bidirectionally between the T1 terminal and the T2 terminal. Further, a triac is known to have four types of trigger modes: trigger modes I, II, III, and IV. In this specification, the trigger mode I refers to a case in which the T2 terminal has a positive potential and the G terminal has the positive potential with respect to the T1 terminal, and the trigger mode II refers to a case in which the T2 terminal has the positive potential and the G terminal has a negative potential with respect to the T1 terminal. The trigger mode III refers to a case in which the T2 terminal has the negative potential and the G terminal has the negative potential with respect to the T1 terminal, and the trigger mode IV refers to a case in which the T2 terminal has the negative potential and the G terminal has the positive potential with respect to the T1 terminal. Here, it is known that the G terminal requires a larger gate current to turn on the triac in the trigger modes III and IV than in the trigger modes I and II (see Japanese Patent Application Laid-Open No. S60-022370, for example).

Meanwhile, when a surge having a high ratio of dv/dt is applied from the AC power source to the triac as in the electrical fast transient/burst immunity test (EFT/B immunity test), for example, the gate current may flow through the G terminal at an undesirable timing. As a result, the triac may be turned on (hereinafter referred to as "false turn-on") to supply power to the heating element at an undesirable timing. To address the false turn-on, there is devised a controller configured to monitor a voltage across both terminals of the triac to detect excessive temperature rise of the heating element caused by the false turn-on of the triac (see Japanese Patent Application Laid-Open No. H06-297808, for example).

In a fixing device in which a plurality of heating elements are connected in parallel via a plurality of triacs, when a surge voltage having a high ratio of dv/dt is continuously applied from the AC power source as in the EFT/B immunity test, and the plurality of triacs are falsely turned on continuously, the following problem occurs. That is, there occurs a problem that power is supplied to the plurality of heating elements at undesirable timings to excessively increase the temperature of the fixing device, for example. In order to prevent such excessive temperature rise of the fixing device caused by the false turn-on of the triacs, there may be used a configuration in which a voltage across both terminals of each of the triacs is monitored as in the related art, but there is a problem that addition of circuit components increases cost and a circuit board area.

SUMMARY OF THE INVENTION

There is provided a heating apparatus, comprising: a first load; a first switch element which includes a T1 terminal, a T2 terminal, and a gate terminal, and is configured to switch between supply of power from an AC power source to the first load and shut-off of power supply; a second load; a second switch element which includes a T1 terminal a T2 terminal, and a gate terminal, and is configured to switch between supply of power from the AC power source to the second load and shut-off of power supply; and a control unit configured to control the first switch element and the second switch element to prevent power from being supplied to both of the first load and the second load, wherein the first switch element has the T1 terminal connected to one end of the first load, and the T2 terminal connected to the AC power source, and the second switch element has the T2 terminal connected to one end of the second load, and the T1 terminal connected to the AC power source, or wherein the first switch element has the T2 terminal connected to the one end of the first load, and the T1 terminal connected to the AC power source, and the second switch element has the T1 terminal connected to the one end of the second load, and the T2 terminal connected to the AC power source.

Further features of the present invention will become apparent from the following description of exemplary embodiments with reference to the attached drawings.

DESCRIPTION OF THE EMBODIMENTS

Modes for carrying out the present invention are described below in detail based on embodiments with reference to the drawings. In the following description, a bidirectional thyristor is described as an example of a switch element having a G terminal, a T1 terminal, and a T2 terminal. Further, a trigger mode I of the switch element refers to a case in which the T2 terminal has a positive potential and the G terminal has the positive potential with respect to the T1 terminal, and a trigger mode II refers to a case in which the T2 terminal has the positive potential and the G terminal has a negative potential with respect to the T1 terminal. Further, a trigger mode III of the switch element refers to a case in which the T2 terminal has the negative potential and the G terminal has the negative potential with respect to the T1 terminal, and a trigger mode IV refers to a case in which the T2 terminal has the negative potential and the G terminal has the positive potential with respect to the T1 terminal. Still further, the G terminal requires a larger gate current to turn on a triac in the trigger modes III and IV than in the trigger modes I and II.

First Embodiment

[Overall Configuration]

Figure 1:
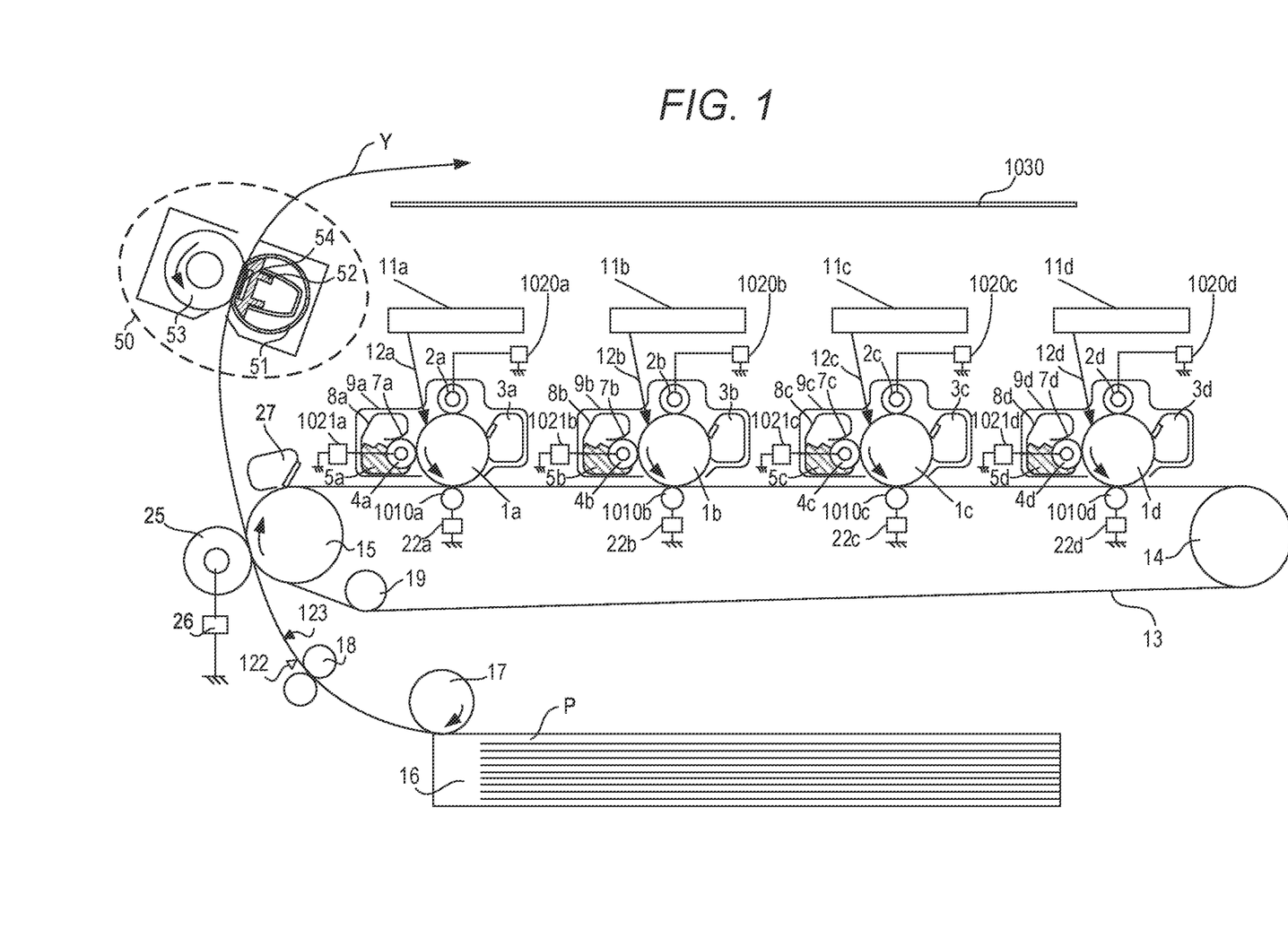
FIG. 1 is a sectional view for schematically illustrating an image forming apparatus according to a first embodiment and a second embodiment.

FIG. 1 is a configuration view for illustrating an inline-type color image forming apparatus being an image forming apparatus having mounted thereon a fixing apparatus according to a first embodiment as an example. With reference to FIG. 1, an operation of an electrophotographic color image forming apparatus is described. A first station corresponds to a station for forming a toner image of a yellow (Y) color, and a second station corresponds to a station for forming a toner image of a magenta (M) color. Further, a third station corresponds to a station for forming a toner image of a cyan (C) color, and a fourth station corresponds to a station for forming a toner image of a black (K) color.

In the first station, a photosensitive drum 1a serving as an image bearing member is an OPC photosensitive drum. The photosensitive drum 1a is formed by laminating a plurality of layers of functional organic materials including, for example, a carrier generating layer formed on a metal cylinder to generate charges through light exposure, and a charge transporting layer for transporting the generated charges. The outermost layer has a low electric conductivity and is almost insulated. A charging roller 2a serving as a charging unit is brought into abutment against the photosensitive drum 1a. Along with the rotation of the photosensitive drum 1a the charging roller 2a is rotated in association therewith to uniformly charge the surface of the photosensitive drum 1a. The charging roller 2a is applied with a voltage on which a DC voltage or an AC voltage is superimposed, and the photosensitive drum 1a is charged by causing discharge at minute air gaps on the upstream and the downstream in a rotation direction from a nip portion between the charging roller 2a and the surface of the photosensitive drum 1a. A cleaning unit 3a is a unit configured to remove toner remaining on the photosensitive drum 1a after transfer to be described later. A developing unit 8a serving as a developing unit includes a developing roller 4a, a nonmagnetic one-component toner 5a, and a developer applying blade 7a. The photosensitive drum 1a, the charging roller 2a, the cleaning unit 3a, and the developing unit 8a form an integral process cartridge 9a which is removably mounted to the image forming apparatus.

An exposure device 11a serving as an exposing unit includes a scanner unit configured to scan laser light by a polygon mirror, or a light emitting diode (LED) array. The exposure device 11a radiates a scanning beam 12a modulated based on an image signal onto the photosensitive drum 1a. Further, the charging roller 2a is connected to a charging high-voltage power source 1020a serving as a voltage supply unit for the charging roller 2a. The developing roller 4a is connected to a development high-voltage power source 1021a serving as a voltage supply unit for the developing roller 4a. A primary transfer roller 1010a serving as a transfer unit is connected to a primary transfer high-voltage power source 22a serving as a voltage supply unit for the primary transfer roller 1010a. The configuration of the first station has been described above, and the second, third, and fourth stations also have similar configurations. As for the other stations, components having same functions as those of the first station are denoted by same reference numerals, and the reference numerals are provided with suffixes "b", "c", and "d" for the respective stations. In the following description, the suffixes "a", "b", "c", and "d" are omitted except for a case in which a specific station is described.

An intermediate transfer belt 13 is supported by three rollers of a secondary transfer opposing roller 15, a tension roller 14, and an auxiliary roller 19 serving as stretching members for the intermediate transfer belt 13. Only the tension roller 14 is applied with a force by a spring in a direction of stretching the intermediate transfer belt 13, and thus an appropriate tension force is maintained with respect to the intermediate transfer belt 13. The secondary transfer opposing roller 15 follows the drive of a main motor (not shown) to rotate, and thus the intermediate transfer belt 13 wound around an outer periphery of the secondary transfer opposing roller 15 is rotated. The intermediate transfer belt 13 is moved at a substantially same speed in a forward direction (for example, clockwise direction of FIG. 1) with respect to the photosensitive drums 1a to 1d (for example, rotation in the counterclockwise direction of FIG. 1). Further, the intermediate transfer belt 13 is rotated in the arrow direction (clockwise direction), and the primary transfer roller 1010 is arranged on the opposite side of the photosensitive drum 1 across the intermediate transfer belt 13 so as to rotate in association with the movement of the intermediate transfer belt 13. A position at which the photosensitive drum 1 and the primary transfer roller 1010 are brought into abutment against each other across the intermediate transfer belt 13 is referred to as "primary transfer position." The auxiliary roller 19, the tension roller 14, and the secondary transfer opposing roller 15 are electrically grounded. The second to fourth stations have primary transfer rollers 1010b to 1010d configured similarly to the primary transfer roller 1010a of the first station, and hence description thereof is omitted here.

Next, an image forming operation of the image forming apparatus according to the first embodiment is described. When the image forming apparatus receives a printing instruction under a standby state, the image forming apparatus starts the image forming operation. The photosensitive drum 1, the intermediate transfer belt 13, and the like start rotation in the arrow direction at a predetermined process speed by the main motor (not shown). The photosensitive drum 1a is uniformly charged by the charging roller 2a applied with a voltage by the charging high-voltage power source 1020a, and subsequently an electrostatic latent image is formed in accordance with image information (also referred to as "image data") by the scanning beam 12a radiated from the exposure device 11a. The toner 5a in the developing unit 8a is negatively charged to be applied on the developing roller 4a by the developer applying blade 7a. Then, the developing roller 4a is supplied with a predetermined developing voltage by the development high-voltage power source 1021a. When the photosensitive drum 1a is rotated so that the electrostatic latent image formed on the photosensitive drum 1a arrives at the developing roller 4a, the negative toner adheres on the electrostatic latent image so as to be visible, and a toner image of a first color (for example, yellow (Y)) is formed on the photosensitive drum 1a. The stations of the other colors of magenta (M), cyan (C), and black (K) (process cartridges 9b to 9d) also operate similarly. A write signal from a controller (not shown) is delayed at a constant timing depending on distances between the primary transfer positions of the respective colors so that electrostatic latent images are formed by exposure on the photosensitive drums 1a to 1d. The primary transfer rollers 1010a to 1010d are each applied with a DC high voltage having a polarity opposite to that of toner. With the above-mentioned steps, toner images are sequentially transferred onto the intermediate transfer belt 13 (hereinafter referred to as "primary transfer"), and thus multi-layered toner images are formed on the intermediate transfer belt 13.

After that, in synchronization with the formation of the toner images, sheets P corresponding to recording materials stacked on a cassette 16 are conveyed along a conveyance path Y. Specifically, the sheet P is fed (picked up) by a sheet feeding roller 17 driven to rotate by a sheet feeding solenoid (not shown). The fed sheet P is conveyed to registration rollers 18 by conveyance rollers. Then, the sheet P passes through a sheet width sensor 122 configured to detect a length of the sheet in a direction orthogonal to a conveyance direction (hereinafter referred to as "width"). A registration sensor 123 is arranged on the downstream of the registration rollers 18. The registration sensor 123 detects the "presence" of the sheet P when a leading edge of the sheet P arrives, and detects the "absence" of the sheet P when a trailing edge of the sheet P passes through the registration sensor 123.

The sheet P is conveyed by the registration rollers 18 to a transfer nip portion being an abutment portion between the intermediate transfer belt 13 and a secondary transfer roller 25 in synchronization with the toner images formed on the intermediate transfer belt 13. The secondary transfer roller 25 is applied with a voltage having a polarity opposite to that of the toner by a secondary transfer high-voltage power source 26. Thus, the multi-layered toner images of the four colors borne on the intermediate transfer belt 13 are collectively transferred onto the sheet P (recording material) (hereinafter referred to as "secondary transfer"). Members contributing to the process until the unfixed toner images are formed on the sheet P (for example, the photosensitive drum 1) function as an image forming unit. Meanwhile, after the secondary transfer is finished, toner remaining on the intermediate transfer belt 13 is removed by the cleaning unit 27. The sheet P that has been subjected to the secondary transfer is conveyed to a fixing apparatus 50 serving as a heating apparatus, to thereby be subjected to fixing of the toner images. Then, the sheet P is discharged to a discharge tray 1030 as an image-formed object (print or copy). The fixing apparatus 50 includes a film 51 serving as a first rotary member, a nip forming member 52, a pressure roller 53 serving as a second rotary member, and a heater 54. The heater 54 includes a plurality of heating elements to be described later, and the plurality of heating elements are provided to be in contact with an inner surface of the film 51. Further, the pressure roller 53 forms a nip portion together with the film 51, and the nip portion is formed by the plurality of heating elements and the pressure roller 53 via the film 51.

[Circuit Block Diagram of Fixing Apparatus]

(First Closed Circuit)

Figure 2A:
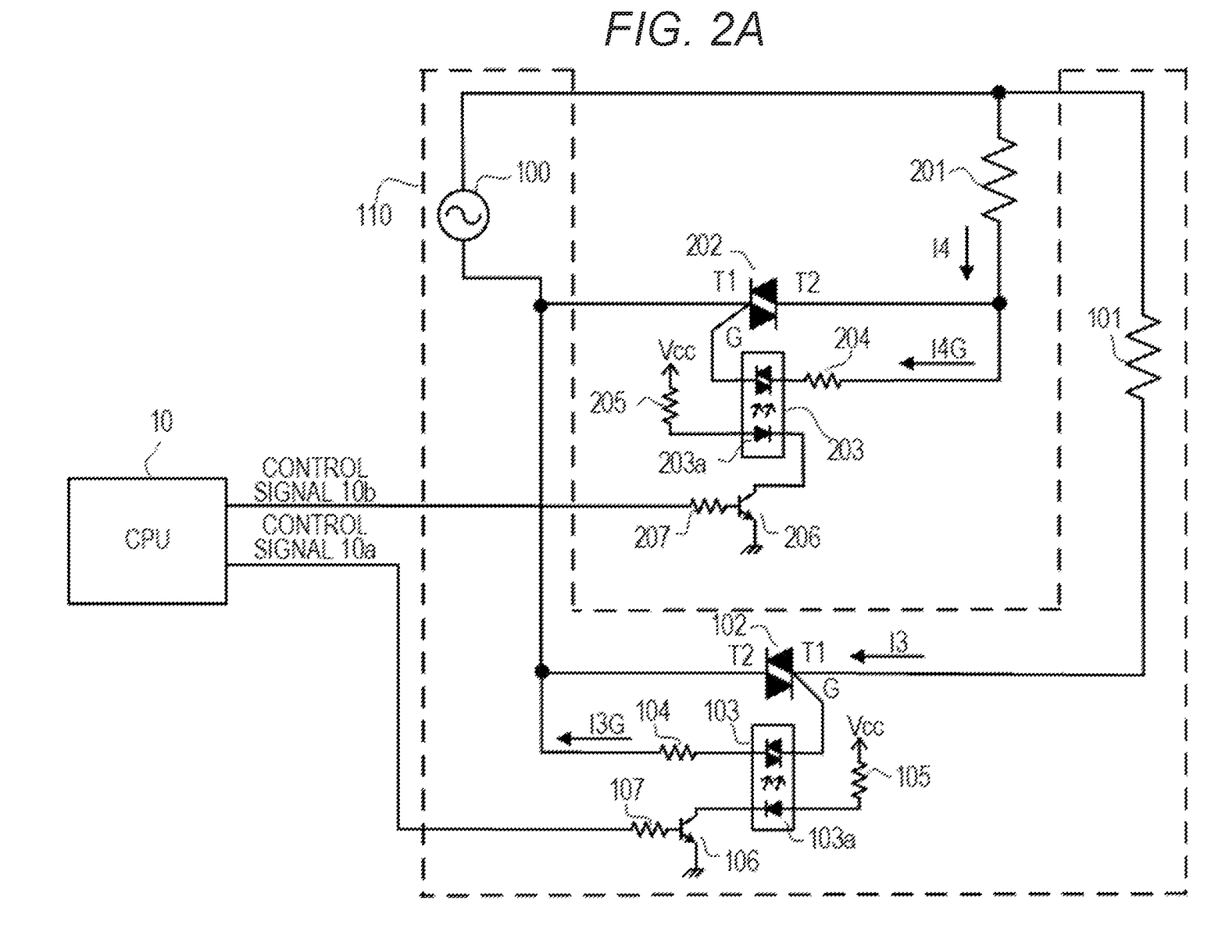
FIG. 2A is a block diagram for illustrating a first closed circuit in the first embodiment.

The fixing apparatus 50 includes one or more heating elements serving as the heater 54 to be supplied with power from an AC power source to generate heat. Description is given of the first embodiment relating to a method of controlling the heating elements with reference to FIG. 2A, FIG. 2B, and FIG. 3. FIG. 2A is a circuit block diagram for illustrating a first closed circuit. A first closed circuit 110 mainly includes an AC power source 100, a first heating element 101 (hereinafter referred to as "heating element 101") serving as a first load, a bidirectional thyristor (hereinafter referred to as "triac") 102 serving as a first switch element, and a phototriac coupler 103. The first closed circuit 110 also includes a resistor 104, a resistor 105, a resistor 107, and a transistor 106. The heating element 101 generates heat when power from the AC power source 100 is turned on (supplied)/off (shut-off) with the triac 102 being turned on (conductive)/off (non-conductive).

When a light emitting diode 103a inside the phototriac coupler 103 configured to ensure electrical insulation between a primary side and a secondary side emits light, a gate terminal current (hereinafter referred to as "G terminal current") I3G flows through the triac 102. As a result, the triac 102 is turned on (conductive) with a voltage (hereinafter referred to as "G terminal voltage") of the gate terminal becoming a threshold voltage or more. Further, the triac 102 is turned off (non-conductive) at a timing at which an AC voltage of the AC power source 100 crosses zero. The resistor 105 is a current limiting resistor for the light emitting diode 103a. The transistor 106 configured to turn on/off the phototriac coupler 103 is connected to a CPU 10 serving as a control unit via the resistor 107, and performs the on/off operation in accordance with a first control signal 10a (hereinafter referred to as "control signal 10a") output from the CPU 10. Further, the resistor 104 is a bias resistor configured to drive the triac 102. When the CPU 10 turns on the transistor 106 with the control signal 10a, an electric current flows from a power source Vcc to the light emitting diode 103a of the phototriac coupler 103 via the resistor 105. An electric current I3 flows between a T2 terminal and a T1 terminal of the triac 102.

(Second Closed Circuit)

Figure 2B:
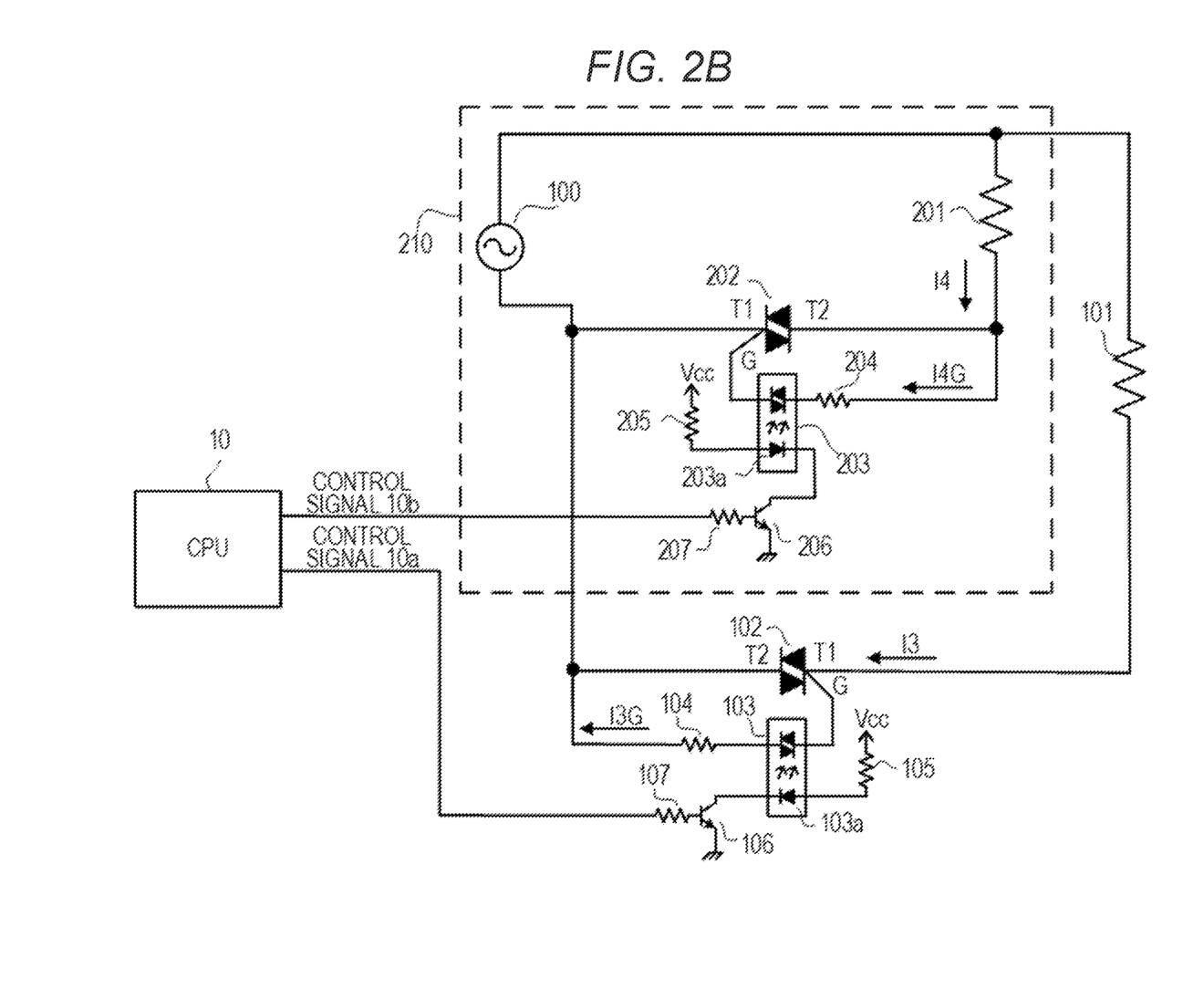
FIG. 2B is a circuit block diagram for illustrating a second closed circuit in the first embodiment.

FIG. 2B is a circuit block diagram for illustrating a second closed circuit. A second closed circuit 210 mainly includes the AC power source 100, a second heating element 201 (hereinafter referred to as "heating element 201") serving as a second load, a triac 202 serving as a second switch element, and a phototriac coupler 203. The second closed circuit 210 also includes a resistor 204, a resistor 205, a resistor 207, and a transistor 206. The heating element 201 generates heat when power from the AC power source 100 is turned on/off with the triac 202 being turned on/off. As to lengths in a lengthwise direction of the heating element 101 and the heating element 201 being lengths in a direction orthogonal to the conveyance direction of the sheet P, the heating element 101 is set longer than the heating element 201, for example. The CPU 10 is configured to control a timing to supply power to the heating element 101 and a timing to supply power to the heating element 201 depending on a length in the direction orthogonal to the conveyance direction of the sheet P, for example. Specifically, the CPU 10 is configured to perform control so that power is exclusively supplied to the heating element 101 and the heating element 201.

When a light emitting diode 203a inside the phototriac coupler 203 configured to ensure electrical insulation between a primary side and a secondary side emits light, a G terminal current I4G flows through the triac 202. As a result, the triac 202 is turned on with a G terminal voltage becoming the threshold voltage or more. Further, the triac 202 is turned off when the AC voltage of the AC power source 100 crosses zero. The resistor 205 is a current limiting resistor for the light emitting diode 203a. The transistor 206 configured to turn on/off the phototriac coupler 203 is connected to the CPU 10 via the resistor 207, and performs the on/off operation in accordance with a second control signal 10b (hereinafter referred to as "control signal 10b") output from the CPU 10. Further, the resistor 204 is a bias resistor configured to drive the triac 202. When the CPU 10 turns on the transistor 206 with the control signal 10b, an electric current flows from the power source Vcc to the light emitting diode 203a of the phototriac coupler 203 via the resistor 205. An electric current I4 flows between a T2 terminal and a T1 terminal of the triac 202.

At this time, as illustrated in FIG. 2A, in the first closed circuit 110, the triac 102 has the T1 terminal connected to one end of the heating element 101, and to the AC power source 100 via the heating element 101. The triac 102 has the T2 terminal connected to the AC power source 100. Meanwhile, as illustrated in FIG. 2B, in the second closed circuit 210, the triac 202 has the T2 terminal connected to one end of the heating element 201, and to the AC power source 100 via the heating element 201. The triac 202 has the T1 terminal connected to the AC power source 100. With this connection, the triac 102 and the triac 202 can be caused to operate always in opposite polarities, specifically alternately in the trigger mode I and the trigger mode III. It is only required that the connection between the triac 102 and the heating element 101 and the connection between the triac 202 and the heating element 201 be in opposite polarities, the following connections can be adopted. The triac 102 may have the T2 terminal connected to the one end of the heating element 101, and the T1 terminal connected to the AC power source 100. Meanwhile, the triac 202 may have the T1 terminal connected to the one end of the heating element 201, and the T2 terminal connected to the AC power source 100.

[Operation Performed when Surge is Applied]

Figure 3:
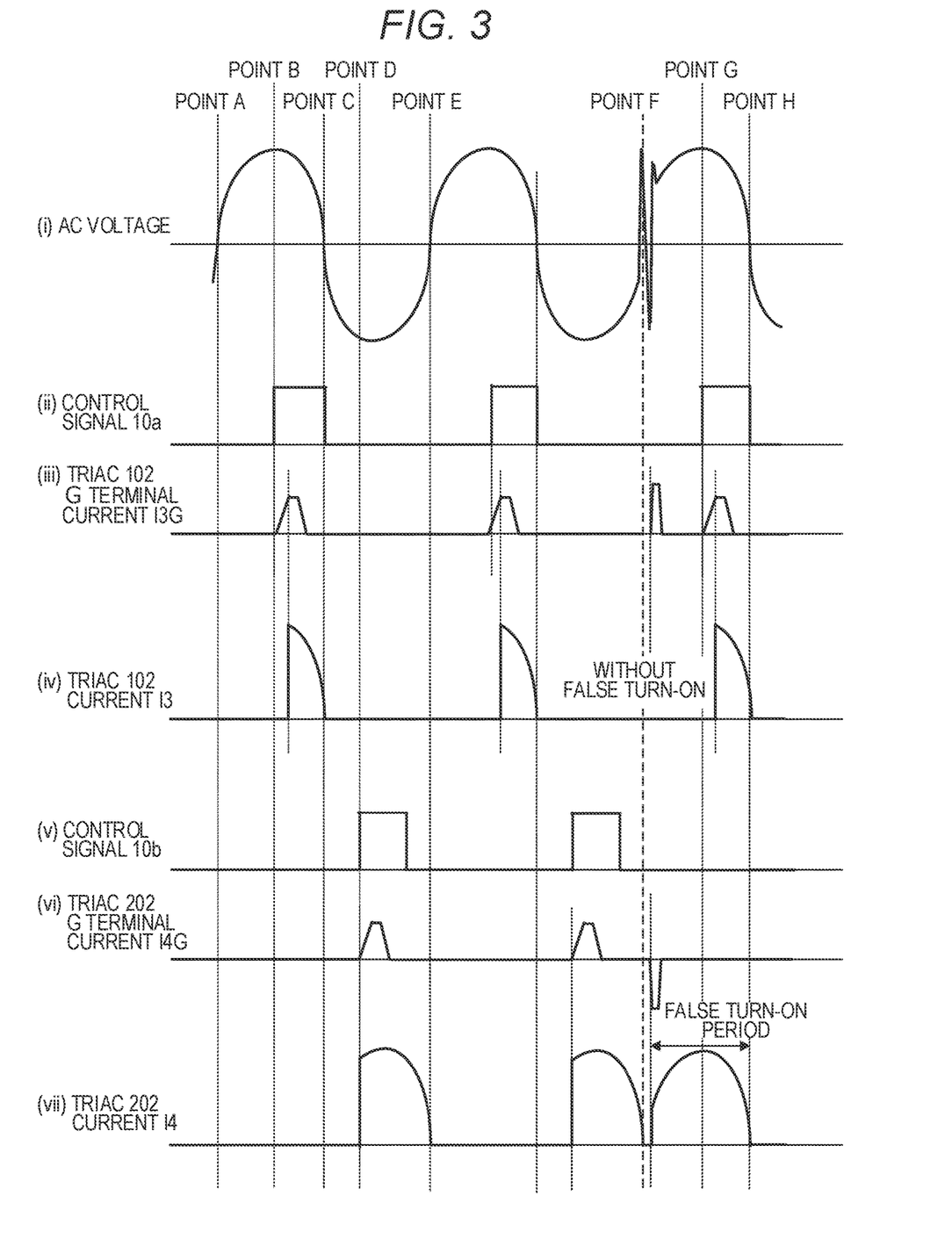
FIG. 3 is a chart for showing operation waveforms of the closed circuits in the first embodiment.

In FIG. 3, Part (i) shows a waveform of the AC voltage output by the AC power source 100. Part (ii) shows a waveform of the control signal 10a output from the CPU 10, Part (iii) shows a waveform of the G terminal current I3G of the triac 102, and Part (iv) shows the electric current I3 flowing between the T2 terminal and the T1 terminal of the triac 102. Part (v) shows a waveform of the control signal 10b output from the CPU 10, Part (vi) shows a waveform of the G terminal current I4G of the triac 202, and Part (vii) shows a waveform of the electric current I4 flowing between the T2 terminal and the T1 terminal of the triac 202. Here, the G terminal current I3G of the triac 102 in Part (iii) is positive in the arrow direction of the G terminal current I3G of FIG. 2A, and when the G terminal current I3G is positive, a trigger signal applied to the gate terminal is negative (trigger mode II or III). Further, the electric current I3 in Part (iv) is positive in the arrow direction of the electric current I3 of FIG. 2A, and when the electric current I3 is positive, the T2 terminal has the negative potential with respect to the T1 terminal of the triac 102 (trigger mode III or IV). Meanwhile, the G terminal current I4G of the triac 202 in Part (vi) is positive in a direction opposite to the arrow direction of the G terminal current I4G of FIG. 2B, and when the G terminal current I4G is positive, a trigger signal applied to the gate terminal is negative (trigger mode II or III). Further, the electric current I4 in Part (vii) is positive in a direction opposite to the arrow direction of the electric current I4 of FIG. 2B, and when the electric current I4 is positive, the T2 terminal has the negative potential with respect to the T1 terminal of the triac 202 (trigger mode III or IV). Still further, the CPU 10 outputs the control signal 10a of a high level in a period of a positive half-wave of the AC voltage, and outputs the control signal 10b of the high level in a period of a negative half-wave of the AC voltage. The CPU 10 may output the control signal 10a of the high level in the period of the negative half-wave of the AC voltage, and output the control signal 10b of the high level in the period of the positive half-wave of the AC voltage.

(Normal Operation)

When the circuits illustrated in FIG. 2A and FIG. 2B operate normally, as shown in FIG. 3, the control signal 10a instructs the transistor 106 to perform the on operation at a point B. As a result, in the triac 102, the T2 terminal has the negative potential and the G terminal has the negative potential with respect to the T1 terminal, and hence an operation in the trigger mode III is started. With the G terminal current I3G flowing through the G terminal of the triac 102 and the G terminal voltage becoming the threshold or more, the triac 102 is turned on, and the electric current I3 is supplied to the heating element 101 in a period from the point B to a point C of FIG. 3. At this time, the point C is the zero-cross timing at which the AC power source 100 switches from the positive potential to the negative potential.

Further, at a point D, the control signal 10b instructs the transistor 206 to perform the on operation. As a result, in the triac 202, the T2 terminal has the negative potential and the G terminal has the negative potential with respect to the T1 terminal, and hence an operation in the trigger mode III is started. With the G terminal current I4G flowing through the G terminal of the triac 202 and the G terminal voltage becoming the threshold or more, the triac 202 is turned on, and the electric current I4 is supplied to the heating element 201 in a period from the point D to a point E of FIG. 3. At this time, the point E is the zero-cross timing at which the AC power source switches from the negative potential to the positive potential. In this manner, the operations from a point A to the point E of FIG. 3 are repeated to drive the heating element 101 and the heating element 201 at normal temperatures.

(Occurrence of Surge)

Now, description is given of a case in which, at a point F of FIG. 3, a surge voltage as represented by the EFT/B immunity test is applied to the waveform of the AC voltage output from the AC power source 100. The G terminal current I3G flows through the G terminal of the triac 102 (negative trigger signal), and the G terminal current I4G flows through the G terminal of the lilac 202 (positive trigger signal). When the AC power source 100 has the positive potential as in the case of the point F of FIG. 3, the triac 102 is in the same trigger mode III as the above-mentioned state with the T2 terminal having the negative potential and the G terminal having the negative potential with respect to the T1 terminal. Meanwhile, the triac 202 enters a state of the trigger mode I with the T2 terminal having the positive potential and the G terminal having the positive potential with respect to the T1 terminal.

A triac requires a larger G terminal current to be turned on in the trigger modes III and IV than in the trigger modes I and II. In other words, the triac is turned on with a lower G terminal current in the trigger mode I than in the trigger mode III. Therefore, the triac 202 in the state of the trigger mode I is turned on, that is, falsely turned on with the G terminal voltage becoming the threshold or more with the G terminal current I4G caused by the surge, and the electric current I4 is supplied to the heating element 201 in a period from the point F to a point H of FIG. 3. In this specification, a period in which the triac 202 is falsely turned on in the period from the point F to the point H is referred to as "false turn-on period." Meanwhile, the triac 102 is not turned on, that is, not falsely turned on ("without false turn-on") with the G terminal voltage having a high threshold in the state of the trigger mode III even when the G terminal current I3G caused by the surge flows. Therefore, the triac 102 operates normally in accordance with an instruction of the control signal 10a from the CPU 10 at a point G. In this manner, at least the triac 102 is not falsely turned on, and hence the heating element 101 does not generate heat. As a result, a time period in which the heating element 101 and the heating element 201 generate heat at the same time can be reduced even when the surge occurs.

The same is true for a case in which a surge occurs in the period of the negative half-wave of the AC voltage. When a surge occurs at or after the point H of FIG. 3, for example, the triac 102 enters the state of the trigger mode I to be falsely turned on, and the heating element 101 generates heat. Meanwhile, the triac 202 is not falsely turned on in the state of the trigger mode III. Therefore, even when a surge occurs in the period of the negative half-wave of the AC voltage, a time period in which the heating element 101 and the heating element 201 generate heat at the same time can be reduced.

Through connection of the triac 102 and the triac 202 to the AC power source 100 in opposite polarities as described above, the heating element 101 and the heating element 201 can be prevented from generating heat at the same time continuously in an undesired abnormal state. As a result, the excessive temperature rise of the fixing apparatus 50 can be prevented without additionally installing a circuit configured to detect the false turn-on of the triacs or a circuit configured to detect excessive temperature rise of the fixing apparatus 50, for example.

In the first embodiment, the configuration in which two triacs are connected in parallel is described, but the present invention is not limited thereto. As long as at least one of the triacs connected in parallel is connected in the opposite polarity as described above, three or more triacs may be connected in parallel. As described above, according to the first embodiment, the false turn-on of the semiconductor elements can be reduced without adding circuit components.

Second Embodiment

[Circuit Block Diagram of Fixing Apparatus]
(First Closed Circuit)

Figure 4:
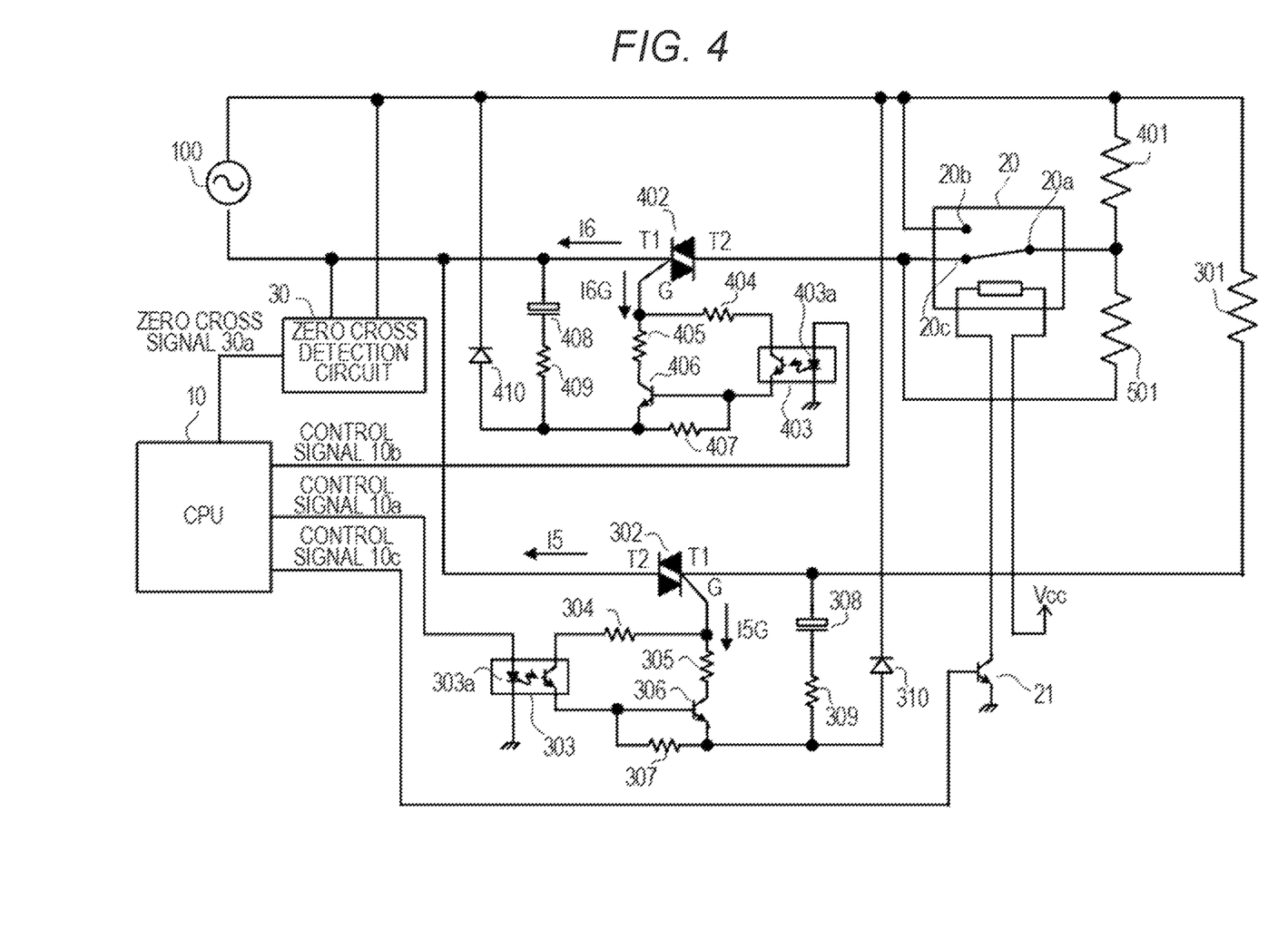
FIG. 4 is a circuit block diagram for illustrating a drive circuit for heating elements in the second embodiment.
Figure 5A:
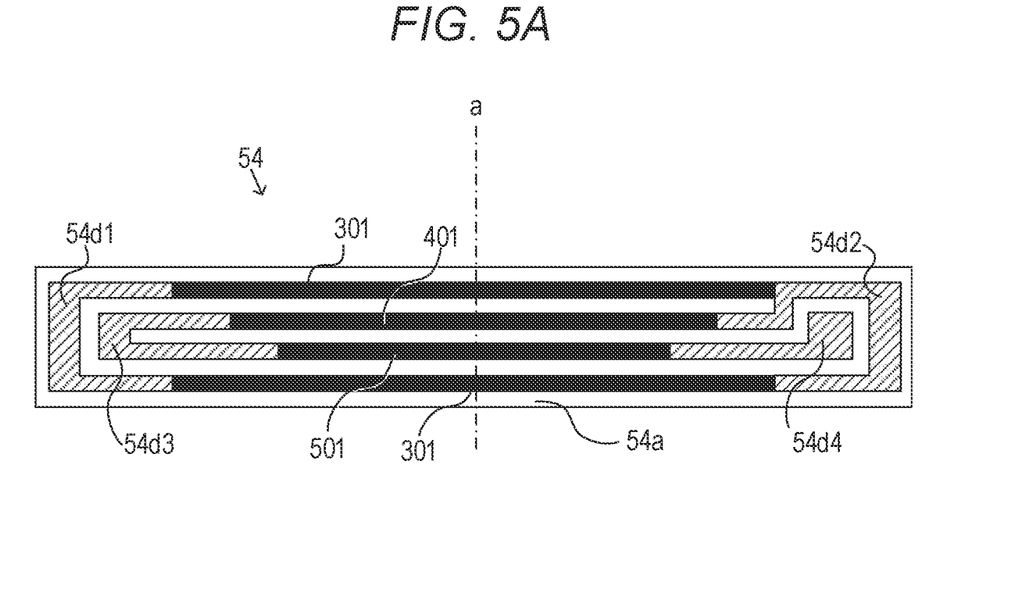
FIG. 5A is a schematic view of the heating elements in the second embodiment.
Figure 5B:
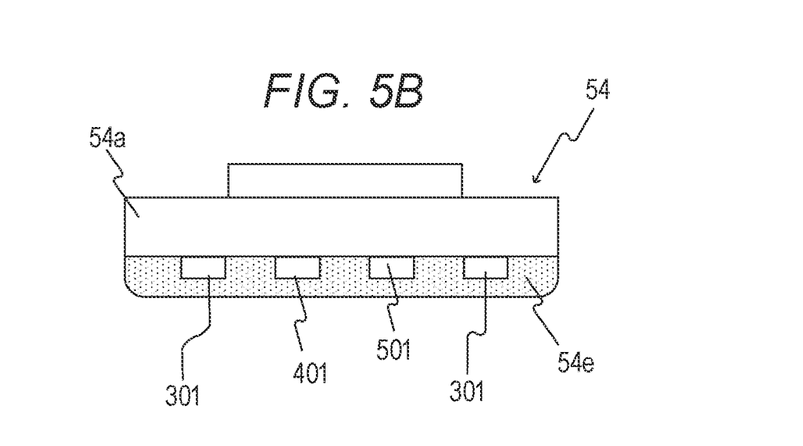
FIG. 5B is a sectional schematic view of the heating elements in the second embodiment.
Figure 6:
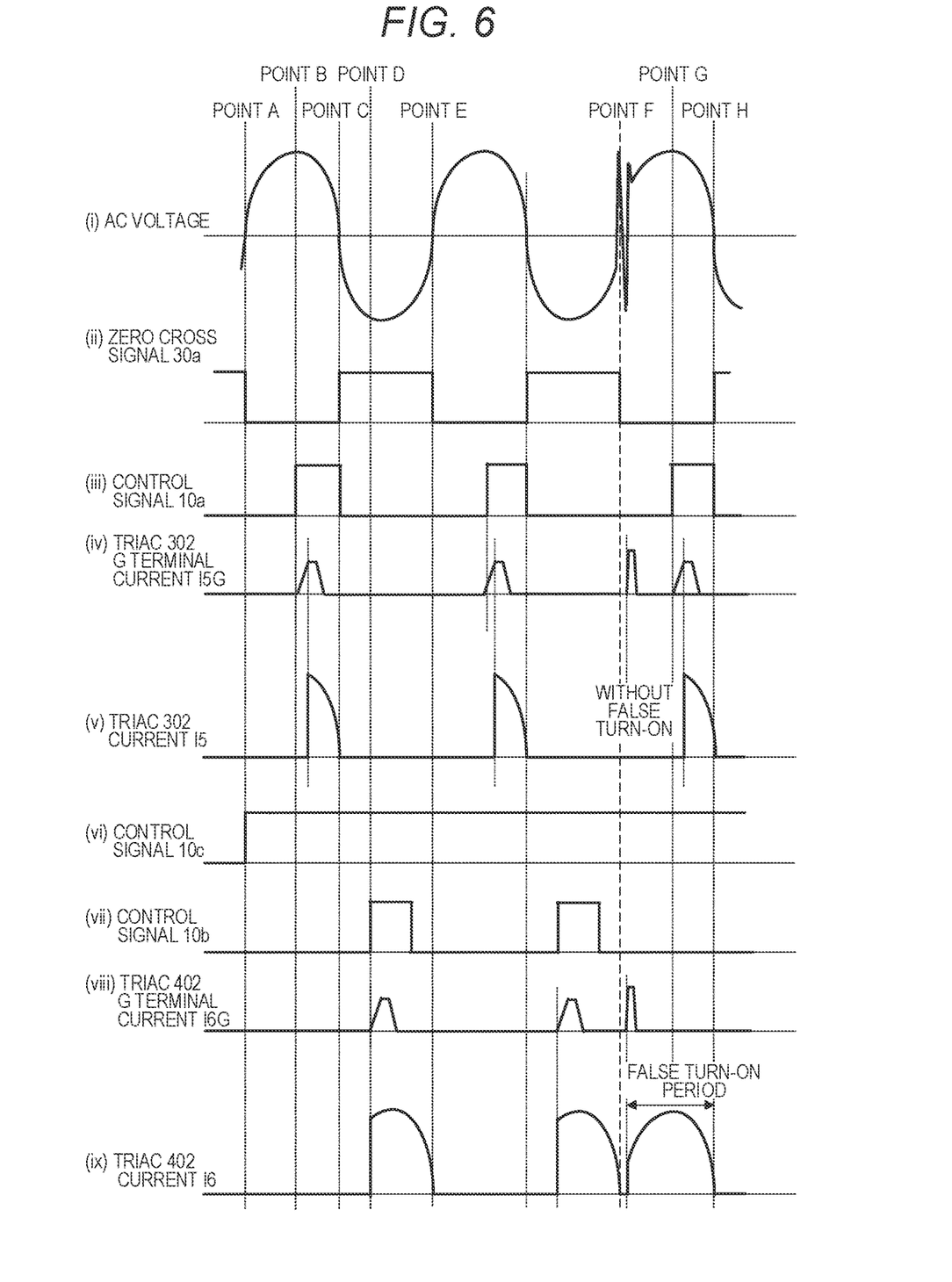
FIG. 6 is a chart for showing operation waveforms of a drive circuit in the second embodiment.

Description is given of a second embodiment with reference to FIG. 4 to FIG. 6. First, a first closed circuit is described with reference to FIG. 4. The first closed circuit is mainly formed of the AC power source 100, a heating element 301, a triac 302, a photocoupler 303, a resistor 304, a resistor 305, a resistor 307, a resistor 309, a transistor 306, an aluminum electrolytic capacitor 308, and a diode 310.

The heating element 301 is configured to generate heat with power supply from the AC power source 100 being turned on/off with the triac 302 being turned on/off. The triac 302 is turned on by the transistor 306 when a light emitting diode 303a inside the photocoupler 303 configured to ensure electrical insulation between a primary side and a secondary side emits light. When the transistor 306 is turned on, the triac 302 is turned on with a G terminal current I5G flowing from the aluminum electrolytic capacitor 308 to the triac 302 and a G terminal voltage becoming the threshold voltage or more. Further, the triac 302 is turned off at a timing at which the AC voltage of the AC power source 100 crosses zero. The light emitting diode 303a is connected to the CPU 10, and becomes conductive/non-conductive in accordance with the control signal 10a output from the CPU 10.

At this time, the AC voltage output from the AC power source 100 is input to a zero cross detection circuit 30 serving as a detection unit, and the zero cross detection circuit 30 is configured to notify the CPU 10 that the AC voltage has become a threshold or less as a zero cross signal 30a being a pulse signal. The CPU 10 controls the triac 302 and a triac 402 to be described later based on a detection result of the zero cross detection circuit 30. Specifically, the CPU 10 detects a rising edge and a falling edge of the zero cross signal 30a input from the zero cross detection circuit 30, and determines whether to output the control signal 10a as the high level or a low level.

The resistor 304 is a resistor configured to limit a collector current of the photocoupler 303, and the resistor 305 is a resistor configured to limit a collector current of the transistor 306. The resistor 307 is a resistor configured to stabilize a base voltage of the transistor 306. The aluminum electrolytic capacitor 308 is configured to supply the G terminal current I5G to the triac 302, and the resistor 309 is a current limiting resistor for the aluminum electrolytic capacitor 308. The diode 310 is configured to shut off the electric current supplied from the AC power source 100. An electric current I5 flows between a T2 terminal of the triac 302 and a T1 terminal of the triac 302.

(Second Closed Circuit)

Next, a second closed circuit is described with reference to FIG. 4. The second closed circuit includes the AC power source 100, a third heating element 401 (hereinafter referred to as "heating element 401") serving as a third load, the triac 402, and a photocoupler 403. The second closed circuit also includes a resistor 404, a resistor 405, a resistor 407, a resistor 409, a transistor 406, an aluminum electrolytic capacitor 408, and a diode 410. The second closed circuit further includes a relay 20 serving as a switching unit, and a transistor 21.

The heating element 401 is configured to generate heat with power supply from the AC power source 100 being turned on/off with the triac 402 being turned on/off. The triac 402 is turned on by the transistor 406 when a light emitting diode 403a inside the photocoupler 403 configured to ensure electrical insulation between a primary side and a secondary side emits light. When the transistor 406 is turned on, the triac 402 is turned on with a G terminal current I6G flowing from the aluminum electrolytic capacitor 408 to the triac 402 and a G terminal voltage becoming the threshold voltage or more. Further, the triac 402 is turned off at a timing at which the AC voltage of the AC power source 100 crosses zero. The light emitting diode 403a is connected to the CPU 10, and becomes conductive/non-conductive in accordance with the control signal 10b output from the CPU 10. At this time, for the control signal 10b as with the control signal 10a, the CPU 10 detects the rising edge and the falling edge of the zero cross signal 30a to determine whether to output the control signal 10b as the high level or the low level.

The resistor 404 is a resistor configured to limit a collector current of the photocoupler 403, and the resistor 405 is a resistor configured to limit a collector current of the transistor 406. The resistor 407 is a resistor configured to stabilize a base voltage of the transistor 406. The aluminum electrolytic capacitor 408 is configured to supply the G terminal current I6G to the triac 402, and the resistor 409 is a current limiting resistor for the aluminum electrolytic capacitor 408. The diode 410 is configured to shut off the electric current supplied from the AC power source 100. An electric current I6 flows between a T2 terminal of the triac 402 and a T1 terminal of the triac 402.

As the relay 20, a double pole switching relay is used in the second embodiment, for example, to allow switching between the heating element 401 and a fourth heating element 501 (hereinafter referred to as "heating element 501") serving as a fourth load. The relay 20 is controlled by the transistor 21 configured to operate in accordance with a control signal 10c output from the CPU 10. The relay 20 includes contacts 20a, 20b, and 20c, and is configured to switch between a state in which the contact 20a and the contact 20b are connected and a state in which the contact 20a and the contact 20c are connected with the control signal 10c output from the CPU 10. With this configuration, a switch is performed between a power supply path for supplying power from the AC power source 100 to the heating element 401 and a power supply path for supplying power from the AC power source 100 to the heating element 501. Control to switch between the relay contact 20b side and the relay contact 20c side of the relay 20 switches power supply between the heating element 401 and the heating element 501. In the configuration of the second closed circuit in the second embodiment, the heating element 401 is used, and hence the relay 20 is controlled by the CPU 10 and the transistor 21 so that the relay contact 20a and the relay contact 20c are connected.

(Third Closed Circuit)

Next, a third closed circuit is described with reference to FIG. 4. The third closed circuit in the second embodiment has a configuration in which, in contrast to the second closed circuit described above, the heating element 501 is used instead of the heating element 401. In other words, the relay 20 is controlled by the CPU 10 and the transistor 21 so that the relay contact 20a and the relay contact 20b are connected. As to lengths in the lengthwise direction of the heating element 301, the heating element 401, and the heating element 501 being lengths in a direction orthogonal to the conveyance direction of the sheet P, the heating element 301 is set longer than the heating element 401, and the heating element 401 is set longer than the heating element 501, for example. The CPU 10 is configured to control a timing to supply power to the heating element 301 and a timing to supply power to the heating element 401 or the heating element 501 depending on a length in the direction orthogonal to the conveyance direction of the sheet P, for example.

In the three closed circuits as described above, as illustrated in FIG. 4, in the first closed circuit, the triac 302 has the T1 terminal connected to one end of the heating element 301, and to the AC power source 100 via the heating element 301. The triac 302 has the T2 terminal connected to the AC power source 100. In the second closed circuit, the triac 402 has a T2 terminal connected to one end of the heating element 401, and to the AC power source 100 via the heating element 401. The triac 402 has a T1 terminal connected to the AC power source 100. In the third closed circuit, the triac 402 has the T2 terminal connected to one end of the heating element 501, and to the AC power source 100 via the heating element 501. Then, power is supplied from the AC power source 100 with a combination of the heating element 301 and the heating element 401, or of the heating element 301 and the heating element 501. With this connection, the triac 302 and the triac 402 can be caused to operate always in opposite polarities, specifically alternately in the trigger mode II and the trigger mode III.

[Arrangement of Heating Elements on Circuit Board]

FIG. 5A is a schematic view of the heater 54, and FIG. 5B is a sectional schematic view of the heater 54. Further, FIG. 5B is a view for illustrating a cross section of the heater 54 along a center line in the lengthwise direction of the heating elements 301, 401, and 501, that is, a center line (one-dot chain line "a" of FIG. 5A) in the lengthwise direction of the sheet P conveyed by the fixing apparatus 50. The line "a" is hereinafter referred to as "reference line a".

The heater 54 is described in detail with reference to FIG. 5A. The heater 54 is formed of a circuit board 54a, two heating elements 301, the heating element 401, the heating element 501, contacts 54d1 to 54d4, and a protective glass layer 54e. On the circuit board 54a, the heating elements 301, 401, and 501, and the contacts 54d1 to 54d4 are formed. Further, the protective glass layer 54e is formed thereon to ensure insulation between the heating elements 301, 401, and 501, and the film 51.

On the circuit board 54a, the heating elements 301, the heating element 401, and the heating element 501 are arranged. One of the heating elements 301 is arranged in one end portion in a short direction of the circuit board 54a, and the other of the heating elements 301 is arranged in the other end portion in the short direction of the circuit board 54a. In the short direction, the one heating element 301, the heating element 401, the heating element 501, and the other heating element 301 are arranged in the stated order. To the contact 54d1 being a first contact, one end portions of the one heating element 301 and the other heating element 301 are electrically connected. To the contact 54d2 being a second contact, the other end portions of the one heating element 301, the other heating element 301, and the heating element 401 are electrically connected. To the contact 54d3 being a third contact, one end portions of the heating element 401 and the heating element 501 are electrically connected. To the contact 54d4 being a fourth contact, the other end portion of the heating element 501 is electrically connected.

[Operation Performed when Surge is Applied]

In FIG. 6, Part (i) shows a waveform of the AC voltage output by the AC power source 100, Part (ii) shows a waveform of the zero cross signal 30a output from the zero cross detection circuit 30. Part (iii) shows a waveform of the control signal 10a output from the CPU 10, Part (iv) shows a waveform of the G terminal current I5G of the triac 302, and Part (v) shows an electric current I5 flowing between the T2 terminal and the T1 terminal of the triac 302. Part (vi) of FIG. 6 shows a waveform of the control signal 10c output from the CPU 10. Part (vii) shows a waveform of the control signal 10b output from the CPU 10, Part (viii) shows a waveform of the G terminal current I6G of the triac 402, and Part (ix) shows a waveform of the electric current I6 flowing between the T2 terminal and the T1 terminal of the triac 402. The G terminal current I6G of the triac 402 in Part (viii) is positive in the arrow direction of the G terminal current I6G of FIG. 4, and when the G terminal current I6G is positive, a trigger signal applied to the gate terminal is negative (trigger mode II or III). Positivity and negativity of the other waveforms are similar to those in the first embodiment.

(Normal Operation)

It is assumed that, at a point A of FIG. 6, the CPU 10 outputs the control signal 10c of the high level, the relay contact 20a and the relay contact 20c of the relay 20 are connected, and the heating element 401 is selected. When the circuit illustrated in FIG. 4 operates normally, after the zero cross signal 30a falls at the point A of FIG. 6, the control signal 10a becomes the high level at a point B to instruct the transistor 306 to perform the on operation. As a result, in the triac 302, the T2 terminal has the negative potential and the G terminal has the negative potential with respect to the T1 terminal, and an operation in the trigger mode III is started. With the G terminal current I5G flowing through the G terminal of the triac 302 and the G terminal voltage becoming the threshold voltage or more, the triac 302 is turned on, and the electric current I5 is supplied to the heating elements 301 in a period from the point B to a point C of FIG. 6. At this time, the point C is the zero-cross timing at which the AC power source 100 switches from the positive potential to the negative potential, and the zero cross signal 30a rises.

After the zero cross signal 30a rises at the point C, the control signal 10b instructs the transistor 406 to perform the on operation at a point D. As a result, in the triac 402, the T2 terminal has the negative potential and the G terminal has the negative potential with respect to the T1 terminal, and an operation in the trigger mode III is started. With the G terminal current I6G flowing through the G terminal of the triac 402 and the G terminal voltage becoming the threshold voltage or more, the triac 402 is turned on, and the electric current I6 is supplied to the heating element 401 in a period from the point D to a point E of FIG. 6. At this time, the point E is the zero-cross timing at which the AC power source 100 switches from the negative potential to the positive potential, and the zero cross signal 30a falls. In this manner, the operations from the point A to the point E of FIG. 6 are repeated to drive the heating elements 301 and the heating element 401 at normal temperatures.

(Occurrence of Surge)

Now, description is given of a case in which, at a point F of FIG. 6, a surge voltage as represented by the EFT/B immunity test is applied to the waveform of the AC voltage output from the AC power source 100. The G terminal current I5G flows through the G terminal of the triac 302, and the G terminal current I6G flows through the G terminal of the triac 402. When the AC power source 100 has the positive potential as in the case of the point F of FIG. 6, the triac 302 is in the same trigger mode III as the above-mentioned state with the T2 terminal having the negative potential and the G terminal having the negative potential with respect to the T1 terminal. Meanwhile, the triac 402 enters a state of the trigger mode II with the T2 terminal having the positive potential and the G terminal having the negative potential with respect to the T1 terminal.

A triac requires a larger G terminal current to turn on the triac in the trigger modes III and IV than in the trigger modes I and II. In other words, the triac is turned on with a lower G terminal current in the trigger mode II than in the trigger mode III. Therefore, the triac 402 in the state of the trigger mode II is turned on with the G terminal voltage becoming the threshold or more with the G terminal current I6G caused by the surge, and the electric current I6 is supplied to the heating element 401 in a false turn-on period in a period from the point F to a point H of FIG. 6. Meanwhile, the triac 302 is not turned on with the G terminal voltage having a high threshold in the state of the trigger mode III even when the G terminal current I5G caused by the surge flows. Therefore, the triac 302 operates normally in accordance with the control signal 10a from the CPU 10 at a point G. In this manner, at least the heating elements 301 are not falsely turned on, and hence a time period in which the heating elements 301 and the heating element 401 generate heat at the same time can be reduced even when the surge occurs.

The same is true for a case in which a surge occurs in the period of the negative half-wave of the AC voltage. When a surge occurs at or after the point H of FIG. 6, for example, the triac 302 enters the state of the trigger mode II to be falsely turned on, and the heating elements 301 generate heat. Meanwhile, the triac 402 is not falsely turned on in the state of the trigger mode III. Therefore, even when a surge occurs in the period of the negative half-wave of the AC voltage, a time period in which the heating elements 301 and the heating element 401 generate heat at the same time can be reduced.

Through connection of the triac 302 and the triac 402 to the AC power source 100 in opposite polarities as described above, power can be prevented from being supplied to the heating elements 301 and the heating element 401 at the same time continuously in an undesired abnormal state. As a result, the excessive temperature rise of the fixing apparatus 50 can be prevented without installing a circuit configured to detect the false turn-on of the triacs or a circuit configured to detect the excessive temperature rise of the fixing apparatus 50, for example.

In the second embodiment, the configuration in which two triacs are connected in parallel is described, but the present invention is not limited thereto. As long as at least one of the triacs connected in parallel is connected in the opposite polarity, three or more triacs may be connected in parallel. Further, the configuration in which the heating element 401 and the heating element 501 are switched by the relay 20 may be applied in place of the heating element 201 of the first embodiment. As described above, according to the second embodiment, the false turn-on of the semiconductor elements can be reduced without adding circuit components.

According to the embodiments, the false turn-on of the semiconductor elements can be reduced without adding circuit components.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038980, filed Mar. 6, 2020, which is hereby incorporated by reference herein in its entirety.

What is claimed is:

1. A heating apparatus, comprising:
a first heating element;
a first triac which includes a T1 terminal, a T2 terminal, and a gate terminal, and is configured to switch between supply of power from an AC power source to the first heating element and shut-off of power supply;
a second heating element; and
a second triac which includes a T1 terminal, a T2 terminal, and a gate terminal, and is configured to switch between supply of power from the AC power source to the second heating element and shut-off of power supply,
wherein the T1 terminal of the first triac is connected to one end of the first heating element, and the T2 terminal of the first triac is connected to the AC power source, the T2 terminal of the second triac is connected to one end of the second heating element, and the T1 terminal of the second triac is connected to the AC power source, or
wherein the T2 terminal of the first triac is connected to the one end of the first heating element, the T1 terminal of the first triac is connected to the AC power source, the T1 terminal of the second triac is connected to the one end of the second heating element, and the T2 terminal of the second triac is connected to the AC power source.

2. The heating apparatus according to claim 1, further comprising a control unit is configured to output a first control signal for causing the first triac to become conductive, to the gate terminal of the first triac, and output a second control signal for causing the second triac to become conductive, to the gate terminal of the second triac.

3. The heating apparatus according to claim 2, further comprising a detection unit configured to detect a timing at which an AC voltage of the AC power source crosses zero,
wherein the control unit is configured to output, based on a result of the detection by the detection unit, the first control signal in a period of a positive half-wave of the AC voltage, and the second control signal in a period of a negative half-wave of the AC voltage, or
wherein the control unit is configured to output, based on the result of the detection by the detection unit, the first control signal in the period of the negative half-wave of the AC voltage, and the second control signal in the period of the positive half-wave of the AC voltage.

4. The heating apparatus according to claim 1, further comprising:
a first rotary member to be heated by the first heating element or the second heating element;
a heater disposed in an internal space of the first rotary member and including a circuit board on which the first heating element and the second heating element are disposed; and
a second rotary member configured to form a nip portion together with the first rotary member,
wherein the first heating element and the second heating element are different from each other in a heat generation distribution in a longitudinal direction of the circuit board.

5. The heating apparatus according to claim 4, wherein the first rotary member is a film.

6. The heating apparatus according to claim 5,
wherein the nip portion is formed by the heater and the second rotary member via the film.

7. The heating apparatus according to claim 1, further comprising:
a third heating element;
a switching unit configured to switch between a power supply path from the AC power source to the second heating element and a power supply path from the AC power source to the third heating element; and
a control unit configured to control the switching unit to supply power to either the second heating element or the third heating element.

8. The heating apparatus according to claim 7, further comprising:
a fourth heating element which is paired with the first heating element; and
a circuit board on which the first heating element, the second heating element, the third heating element, and the fourth heating element are arranged,
wherein the first heating element is arranged in one end portion in a short direction of the circuit board, and the fourth heating element is arranged in another end portion in the short direction, and
wherein in the short direction, the first heating element, the second heating element, the third heating element, and the fourth heating element, are arranged in order of mention.

9. The heating apparatus according to claim 8, further comprising:
a first contact to which one end portion of the first heating element and one end portion of the fourth heating element are electrically connected;
a second contact to which another end portion of the first heating element, another end portion of the fourth heating element, and another end portion of the second heating element are electrically connected;
a third contact to which one end portion of the second heating element and one end portion of the third heating element are electrically connected; and
a fourth contact to which another end portion of the third heating element is electrically connected.

10. An image forming apparatus comprising:
an image bearing member on which an electrostatic latent image is to be formed;
a developing unit configured to apply toner to the electrostatic latent image formed on the image bearing member to form a toner image;
a transfer unit configured to transfer the toner image to a recording material; and
a heating apparatus, comprising:
a first heating element;
a first triac which includes a T1 terminal, a T2 terminal, and a gate terminal, and is configured to switch between supply of power from an AC power source to the first heating element and shut-off of power supply;
a second heating element; and
a second triac which includes a T1 terminal, a T2 terminal, and a gate terminal, and is configured to switch between supply of power from the AC power source to the second heating element and shut-off of power supply,
wherein (1) the T1 terminal of the first triac is connected to one end of the first heating element, and the T2 terminal of the first triac is connected to the AC power source, the T2 terminal of the second triac is connected to one end of the second heating element, and the T1 terminal of the second triac is connected to the AC power source, or (2) the T2 terminal of the first triac is connected to the one end of the first heating element, the T1 terminal of the first triac is connected to the AC power source, the T1 terminal of the second triac is connected to the one end of the second heating element, and the T2 terminal of the second triac is connected to the AC power source, and wherein the heating apparatus is configured to heat, by the first heating element or the second heating element, the toner image transferred and unfixed to the recording material, to fix the toner image to the recording material.

11. An image forming apparatus comprising:

an image bearing member on which an electrostatic latent image is to be formed;

a developing unit configured to apply toner to the electrostatic latent image formed on the image bearing member to form a toner image;

a transfer unit configured to transfer the toner image to a recording material; and a heating apparatus, comprising:

a first heating element;

a first triac which includes a T1 terminal, a T2 terminal, and a gate terminal, and is configured to switch between supply of power from an AC power source to the first heating element and shut-off of power supply;

a second heating element;

a second triac which includes a T1 terminal, a T2 terminal, and a gate terminal, and is configured to switch between supply of power from the AC power source to the second heating element and shut-off of power supply; and a third heating element, wherein (1) the T1 terminal of the first triac is connected to one end of the first heating element, the T2 terminal of the first triac is connected to the AC power source, the T2 terminal of the second triac is connected to one end of the second heating element, and the T1 terminal of the second triac is connected to the AC power source, or (2) the T2 terminal of the first triac is connected to the one end of the first heating element, the T1 terminal of the first triac is connected to the AC power source, T1 terminal of the second triac is connected to the one end of the second heating element, and the T2 terminal of the second triac is connected to the AC power source, wherein the heating apparatus further comprises a switching unit configured to switch between a power supply path from the AC power source to the second heating element and a power supply path from the AC power source to the third fourth heating element, and wherein the heating apparatus is configured to heat, by the first heating element, the second heating element, or the third heating element, the toner image transferred and unfixed to the recording material, to fix the toner image to the recording material.

12. The heating apparatus according to claim 1, further comprising a control unit configured to control the first triac and the second triac to prevent power from being supplied to both of the first heating element and the second heating element.

13. The heating apparatus according to claim 1, wherein the T1 terminal of the first triac and the gate terminal of the first triac are disposed on one side of the first triac, and the T2 terminal of the first triac is disposed on another side of the first triac, and wherein the T1 terminal of the second triac and the gate terminal of the second triac are disposed on one side of the second triac, and the T2 terminal of the second triac is disposed on another side of the second triac.

* * * * *